G. A. JACKSON.
MUFFLER FOR EXPLOSIVE ENGINES.
APPLICATION FILED DEC. 14, 1908.

927,246.

Patented July 6, 1909.

UNITED STATES PATENT OFFICE.

GEORGE A. JACKSON, OF SEWICKLEY, PENNSYLVANIA, ASSIGNOR OF ONE-FOURTH TO W. MILLER DICKSON, ONE-FOURTH TO DON ROSE, AND ONE-FOURTH TO MILTON H. KNOWLES, ALL OF SEWICKLEY, PENNSYLVANIA.

MUFFLER FOR EXPLOSIVE-ENGINES.

No. 927,246.      Specification of Letters Patent.      Patented July 6, 1909.

Application filed December 14, 1908. Serial No. 467,370.

*To all whom it may concern:*

Be it known that I, GEORGE A. JACKSON, a citizen of the United States, residing at Sewickley, in the county of Allegheny and State of Pennsylvania, have invented certain new and useful Improvements in Mufflers for Explosive-Engines, of which the following is a specification, reference being had therein to the accompanying drawing.

My invention consists of an improvement in mufflers for explosive engines and it has for its object to provide means for eliminating the noise of the exhaust from engines of this class so as to permit the exhaust or waste gases to escape into the atmosphere at or about atmospheric pressure and practically noiselessly.

The invention consists of one or a series of telescoping cylinders having perforations arranged to provide for successive outward expansive passage of the gases in tortuous paths, from a central throttling muffler pipe, adapted to be connected with the exhaust pipe of the engine.

Figure 1:
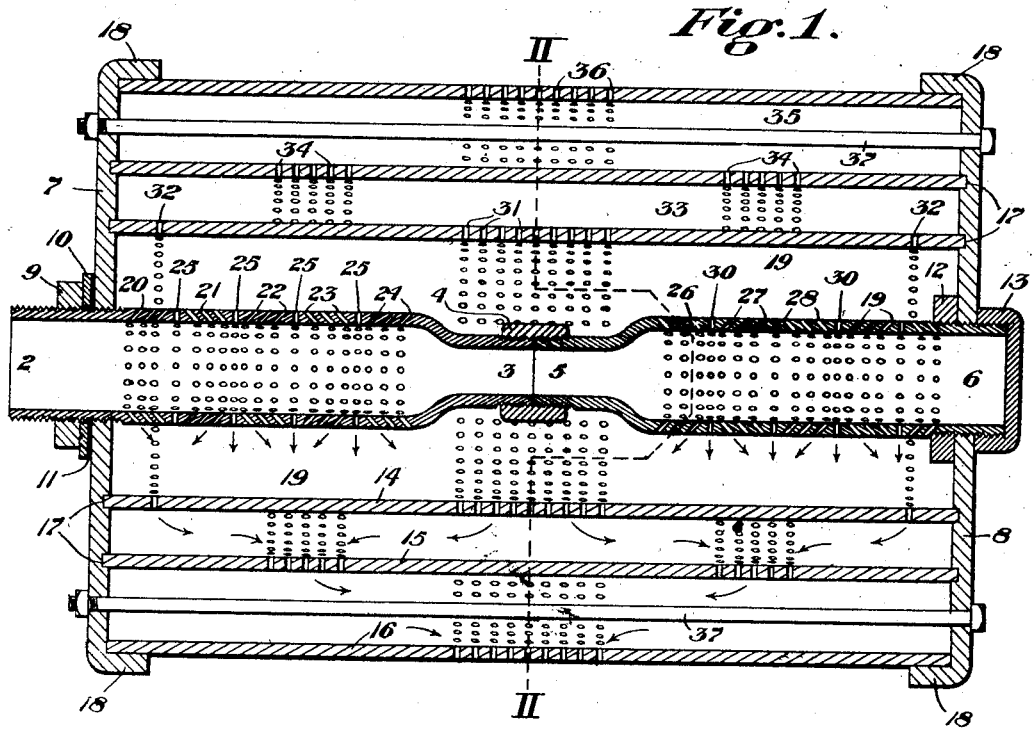
Figure 2:
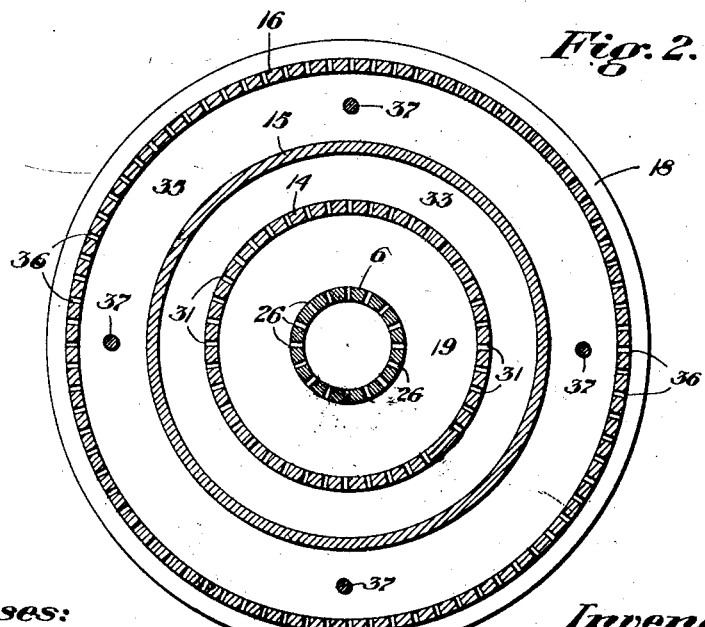

In the drawings illustrating the invention, Figure 1 is a longitudinal central view through a muffler made in accordance with my invention. Fig. 2 is a cross sectional view taken on the broken line II. II. of Fig. 1.

2 represents the inner end of the exhaust pipe extension which by its terminal threads is adapted to be connected with the exhaust pipe of an explosive engine, which pipe 2 is contracted at its inner end 3 and is connected by sleeve coupling 4 with a similar contracted end 5 of a pipe 6 forming a continuation of pipe 2, for convenience in assembling. These two pipe sections may however, be consolidated in a single pipe having a reduced throttling middle portion.

7 and 8 represent heads of the muffler chamber secured centrally at the ends of pipes 2 and 6 respectively by means of a lock nut 9 and washer 10 and preferably intervening packing 11, and at the other end by inner lock nut 12 and an outer cap 13, closing end of pipe 6, or in any other suitable manner, as by connecting rods or bolts 37. As thus constructed it will be seen that the heads 7 and 8 may be tightly clamped by the terminal nuts and cap, or with such supplemental rods, so as to hold the entire structure rigidly together.

Concentrically arranged upon pipes 2 and 6 and between heads 7 and 8, are a series of shells 14, 15 and 16, as shown in the drawing, or of any other number desired. The inner shells 14 and 15 are held concentric with the central pipe by setting their ends in annular grooves 17 on the inner sides of heads 7 and 8, while the outer shell 16 may be suitably held by terminal flanges 18, as clearly shown.

Pipe sections 2 and 6 are perforated by annularly arranged series of outlet ports, closely assembled and of a sufficient size, say one-eighth inch in diameter, to permit the escape outwardly to cavity 19 of part of the products of combustion entering into the tube 2. As shown, the first series of such perforations 20 is arranged slantingly forward at an angle of about 45°, beyond which is a series of similar openings 21 sloping backwardly in a reversed direction at about the same angle, while beyond series 21 is a third series 22, similar to series 20; beyond which is a series 23, similar to series 21; beyond which is a final series 24, similar to the series 20 and 22. Between each of said series or between as many pairs of the reversed series as may be desired, are interposed additional series of ports 25 extending straight out through the walls as shown. By this arrangement, the products of combustion entering pipe 2 from the engine will pass forwardly and partially through the throttling reduced terminals 3 and 5, expanding beyond such reduced portions in the enlarged interior of pipe 6. A considerable portion of the gases, however, will be baffled backwardly from the shoulders at the throttled terminal of pipe 2, and will escape outwardly through ports 20, 21, 22, 23, 24 and 25 in the directions of said ports. Thus some of the gases upon entering will pass freely out through ports 20, 22 and 24 and some gases will be reversed and pass backwardly through ports 21 and 23, in a direction transverse of the currents escaping through the other ports, while between the series of reversed ports, some of the gases will pass directly out at right angles through ports 25. The pipe 6 is similarly provided with alternately disposed series of exhaust ports 26, 27, 28 and 29 with intervening straight ports 30, whereby the gases from the interior of said pipe will likewise escape therefrom in opposing directions into the surrounding cavity 19. The effect of such distribution of the gases through the various series of ports is to tend, by the conflicting currents, to counteract the force of each other and produce a complete commingling within chamber 19 and such action is supplementary to the initial deadening effect of the throttling of the gases in the reduced necks 3 and 5.

The gases, in addition to their cross conflicting currents will expand within the enlarged area or cavity of chamber 19, and good results may be had by exhausting to the atmosphere from shell 14. For the purpose of still further producing the mixing effect to reduce the pressure to a general average, I prefer a plurality of such shells, the next succeeding shell 14 being provided with a series of annularly arranged exhaust ports 31 about midway between the series 24 and 26 and likewise provided with one or more annular rows of ports 32, 32, at each end of the shell. The object in so arranging these ports is that they will be out of alinement as much as possible with the ports of tubes 2 and 6 so as to cause the gases to pass tortuously through chamber 19 to escape outwardly through the ports of shell 14 into the next cavity 33 between shell 14 and shell 15. Shell 15 is likewise provided with annularly arranged series of exhaust ports 34, 34, at each side of its middle portion and offset between the ports 31 and ports 32 so as to produce the same tortuous travel. The gases in passing through each shell into the next succeeding chamber will, in addition to their constant change of direction, continue to expand until they enter cavity 35 between shell 15 and outermost shell 16. Said shell 16 is finally provided with an annular series of exhaust ports 36 arranged about midway of its length and between ports 34, 34, through which the gases will finally pass to the atmosphere. The resultant effect of the tortuous or staggered travel of the gases in their passage from the inner pipe finally to the atmosphere, in combination with the successive expansive action and the constant baffling by the walls, results in the gases finally escaping into the atmosphere at practically uniform pressure, and at a pressure so reduced that it will approximate or only slightly exceed that of the atmosphere. All noise and vibration is substantially eliminated, avoiding the annoyance of the ordinary exhaust, and in practice I have found the device to give excellent results when made and constructed in the manner above described.

It will be understood that the device may be made in any desired size or proportions and I do not wish to be limited to the exact construction or arrangement or number of parts, as these may be changed or varied by the skilled mechanic to suit different conditions of use.

Having described my invention what I claim is:—

1. A muffler for explosive engines consisting of an exhaust pipe extension having a contracted portion between its ends and provided with annularly arranged outlet ports at each side thereof, substantially as set forth.

2. A muffler for explosive engines consisting of an exhaust pipe extension having a contracted portion between its ends, and provided with annularly arranged outlet ports extending angularly through the shell of the pipe, substantially as set forth.

3. A muffler for explosive engines consisting of an exhaust pipe extension having a contracted portion between its ends, and provided with annularly arranged outlet ports extending angularly through the shell of the pipe, the ports at each side of the middle contracted portion being disposed outwardly and backwardly toward the middle contracted portion, substantially as set forth.

4. A muffler for explosive engines consisting of an exhaust pipe extension having a contracted portion between its ends and provided with annularly arranged outlet ports and a surrounding shell having similar outlet ports, substantially as set forth.

5. A muffler for explosive engines consisting of an exhaust pipe extension reduced in area between its ends and provided with annularly arranged outlet ports, and a surrounding shell having similar outlet ports in staggered arrangement with relation to the ports of the exhaust pipe, substantially as set forth.

6. A muffler for explosive engines consisting of an exhaust pipe extension reduced in area between its ends and provided with annularly arranged outlet ports, and a series of concentrically arranged surrounding shells having similar ports, substantially as set forth.

7. A muffler for explosive engines consisting of an exhaust pipe extension reduced in area between its ends and provided with annularly arranged outlet ports arranged in annular series and at opposing angles, and a surrounding shell having annularly arranged outlet ports, substantially as set forth.

8. A muffler for explosive engines consisting of an exhaust pipe extension reduced in area between its ends and provided with annularly arranged outlet ports arranged in annular series and at opposing angles, and a series of concentrically arranged surrounding shells having series of annularly arranged outlet ports, substantially as set forth.

9. The combination with an exhaust pipe extension having a reduced area between its ends and annularly arranged series of outlet ports disposed at opposing angles, of a plurality of concentric surrounding shells having annularly arranged ports, closing heads therefor, and means for securing the parts together, substantially as set forth.

In testimony whereof I affix my signature in presence of two witnesses.

GEORGE A. JACKSON

Witnesses:
C. M. CLARKE,
CHAS. S. LEPLEY.